Feb. 28, 1928. 1,660,552
T. L. GREEN
BISCUIT CUTTING AND EMBOSSING MACHINE
Filed Sept. 24, 1923  3 Sheets-Sheet 2
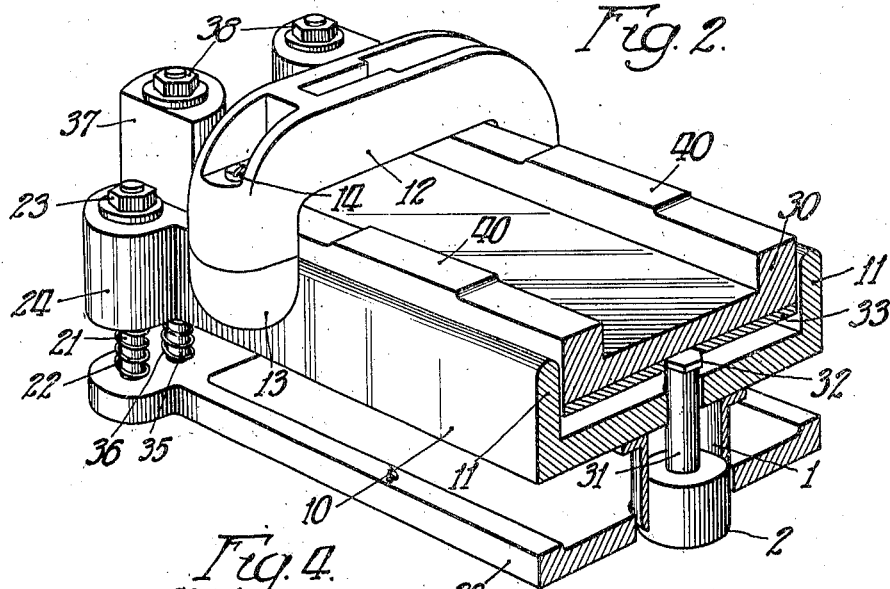
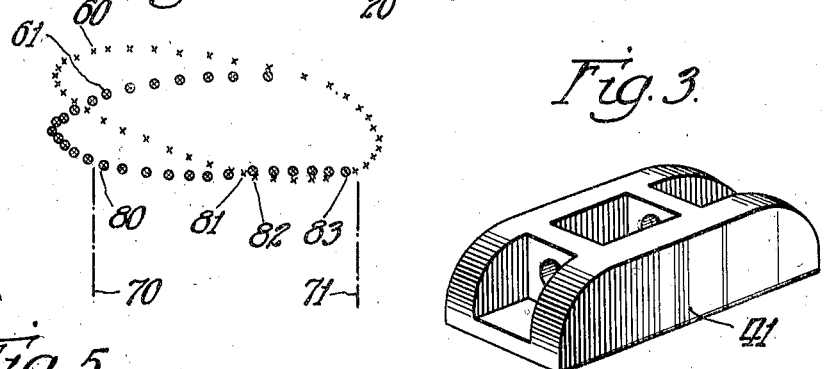
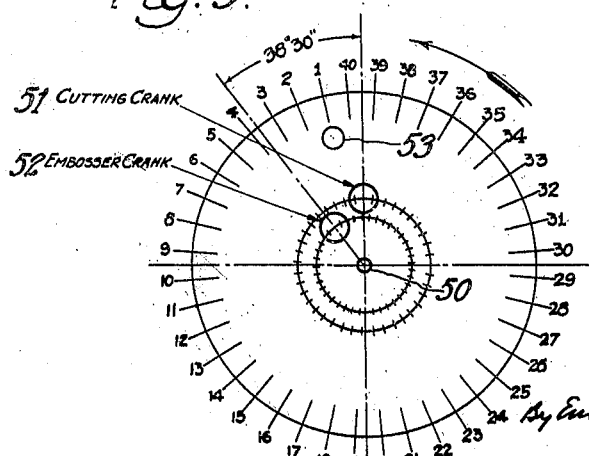
Inventor.
Thomas L. Green.

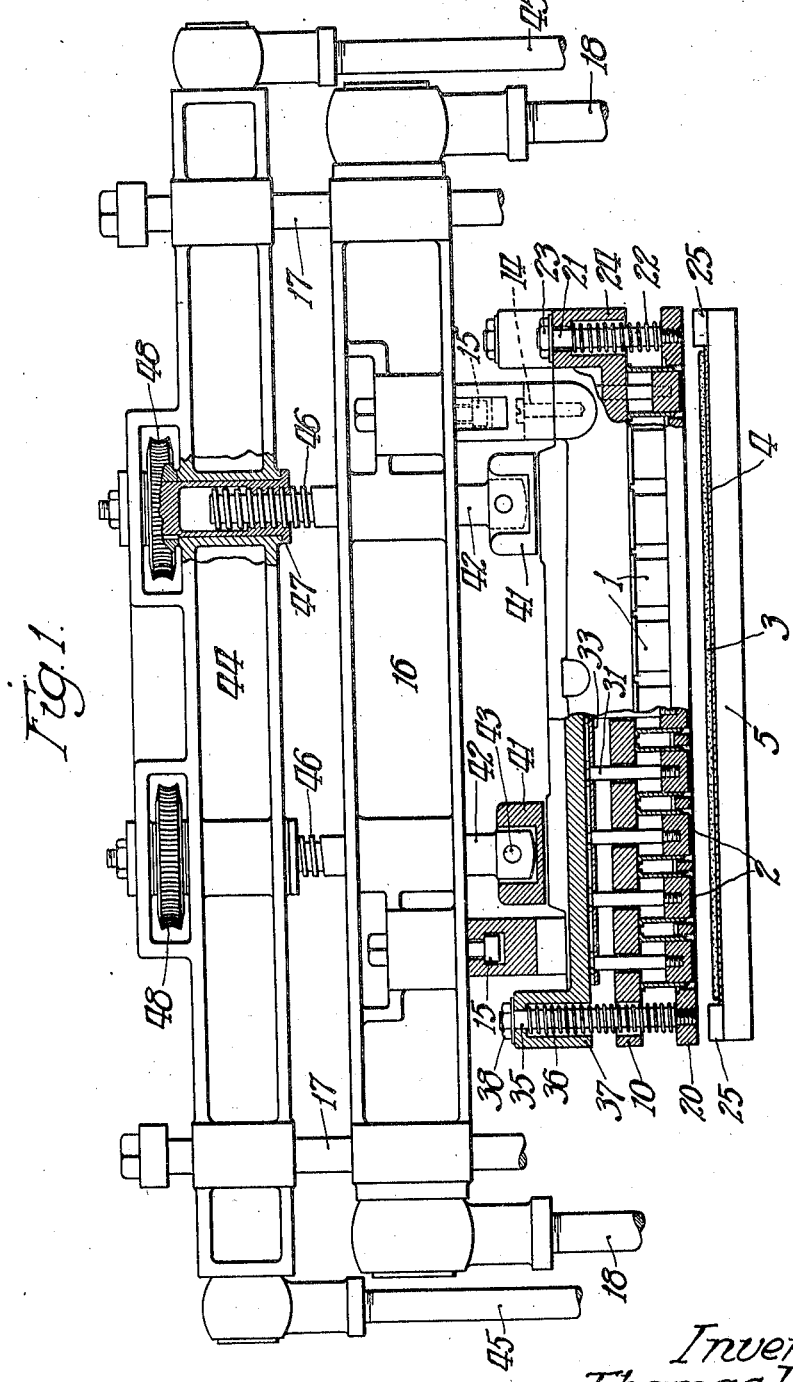

Feb. 28, 1928.
T. L. GREEN
1,660,552
BISCUIT CUTTING AND EMBOSSING MACHINE
Filed Sept. 24, 1923    3 Sheets-Sheet 3
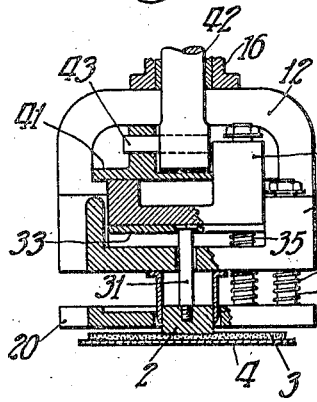
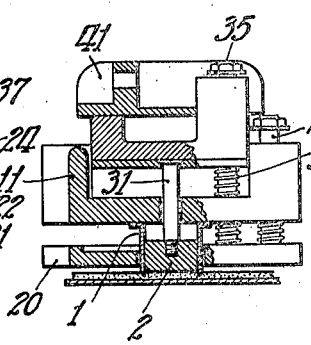
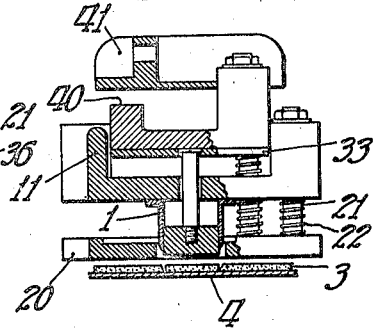
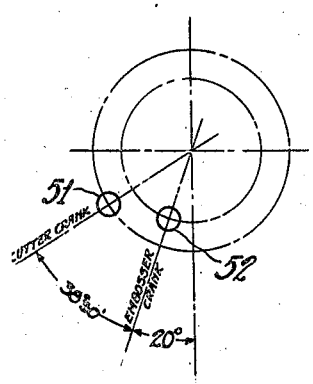
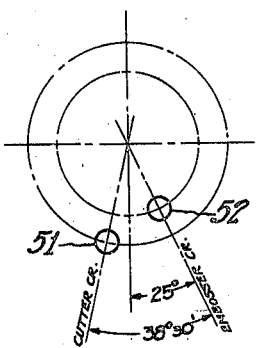
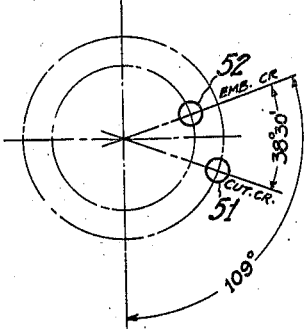
Inventor.
Thomas L. Green.
By Emery, Booth, Janney & Varney
Attys.

Patented Feb. 28, 1928.

1,660,552

UNITED STATES PATENT OFFICE.

THOMAS L. GREEN, OF INDIANAPOLIS, INDIANA.

BISCUIT CUTTING AND EMBOSSING MACHINE.

Application filed September 24, 1923. Serial No. 664,391.

The present invention relates to biscuit and other machines of the embossing cutter type.

Among other objects the invention is intended to provide an efficient and reliable mechanism adapted for high-speed production of embossed biscuits in one aspect of the invention, and, by means of which such biscuits may be accurately cut from a continuously feeding dough sheet.

The invention will be clearly understood by reference to one practicable machine containing an embodiment of the invention, so much of said machine as is necessary for an understanding of the invention being shown in the accompanying drawings.

In said drawings:

Fig. 1 is a front elevation partly in section of the cutting and embossing mechanism of the illustrative machine.

Fig. 2 is a perspective sectional view of a portion of said mechanism comprising parts immediately associated with the cutting and embossing tools or dies.

Fig. 3 is a detail view in perspective of one of the presser feet for bearing upon the member of the mechanism which carries the embossing dies or tools.

Fig. 4 is a diagram representing the orbits of the biscuit cutting and embossing dies in a desired type of machine and under conditions hereinafter described.

Fig. 5 is a diagram explanatory of a desired relationship of cutter and embosser operating cranks or eccentrics in said machine.

Figs. 6, 7 and 8 are views partly in cross section and partly in end elevation of the mechanism immediately operating the cutting and embossing dies or tools.

Figs. 9, 10 and 11 are diagrams representing angular positions of the cutter and embosser operating cranks during the positions of the cutting and embossing tools or dies shown respectively in Figs. 6, 7 and 8.

The cutting and embossing dies or tools of the illustrative mechanism are represented by cup-like cutters 1 and plunger-like embossers 2 working in said cup-like cutters.

A sheet of dough subjected to the operation of said cutters and embossers is designated by the numeral 3 in Figs. 1 and 6 to 8 of the drawings. The dough sheet is carried on an endless apron 4, appearing in cross section in Fig. 1, but not otherwise illustrated herein. As shown in Fig. 1, the apron runs over a bed plate 5 to support the apron during the cutting and embossing operation.

As will be understood by those acquainted with the art, the cutters and embossers reciprocate vertically and at each operation emboss and cut or die-out one or more rows of biscuits from the dough sheet, which is fed through the machine on the apron 4 so as to present successive portions of the sheet to the operation of said cutters and embossers.

The cutters are carried by a cutter-head 10, being appropriately secured to the under side thereof. This cutter-head is represented by a plate having flanges 11 connected by bridge bars 12 which are secured to ears 13 on said flanges by screw bolts 14. By means of hanger bolts 15 engaging under-cut slots in said bridge bars 12, the cutter-head is rigidly secured to the vertically reciprocatory cutter-operating cross-head 16. Said cross-head 16 is guided on the vertical guide rods 17, and is operated from the main crank shaft of the machine by pitman or connecting rods 18.

Suspended from the cutter rod 10, in movable relation thereto, is a so-called stripper plate 20, having openings through which the cutters 1 may protrude. This stripper plate is hung from and yieldingly held a limited distance below the cutter-head by means of studs 21 and springs 22, said studs being slidably connected with or passing loosely through the cutter-head and limiting the downward movement of the stripper plate relative thereto by engagement of the stud heads or units 23 with the cutter-head. The springs 22 are shown as coil springs encircling said studs, the upper portions of said springs being housed in socketed corner projections 24 of the cutter-head through which the studs are passed.

In the operation of the mechanism, before the completion of the down stroke of the cutters, the stripper plate 20 is arrested by engagement with suitable stops or abutments, represented in this instance by ribs 25 on opposite sides of the bed plate 5 (Fig. 1). After such arrest of downward movement of the stripper plate, the cutter-head may continue its downward movement, by virtue of its sliding connection with the studs 21, such movement effecting compression of the springs 22.

The embossers 2 are carried by an embosser-head 30 arranged above and adapted to work vertically within the box-like cutter-head 10. Said embossers are connected to said embosser-head by rods or embosser-stems 31 passing through clearance openings in the cutter-head 10. As a convenient means of attaching the embosser-stems or rods 31 to the embosser-head, said embosser-stems or rods may be provided with square or hexagonal heads 32, as shown more clearly in Fig. 2 of the drawings, and a plate 33 having openings to receive said rods or stems, and slotted or recessed to receive and hold the heads 32 non-rotatably, may be suitably fastened to the under side of the embosser-head, thereby firmly securing the set of embosser-stems or rods thereto.

Said embosser-head 30 is movably connected with and yieldingly supported by the stripper plate 20, by means of studs 35 and springs 36. Said studs 35 are slidably connected with or pass loosely through socketed end projections 37 of the embosser head, and the nuts 38 on said studs are adapted to engage the tops of said projections to limit the upward movement of the embosser head relative to the stripper plate. The springs 36 are shown as coil springs encircling the studs 35 and having their upper portions housed in the socketed embosser-head projections 37. It will be seen that the springs 36 yieldingly support the embosser-head and tend to maintain it raised above the cutter-head and subjacent stripper plate a distance limited by the bolts 35. After arrest of downward movement of the stripper plate, the embosser-head may be pressed downward against the resistance of said springs 36.

The embosser-head is shown in the form of a channel-shaped member having raised flat bearing surfaces 40 for engagement by presser feet or shoes 41 at the lower ends of plunger rods 42. In this instance said plunger rods are shown having headed lower ends entering sockets in said presser feet or shoes and secured thereto by cross pins or bolts 43. Said plunger rods 42 extend vertically through guide openings in the cutter-operating cross-head 16 and are connected with and operated by the vertically-reciprocating embosser-operating cross-head 44. Said cross-head 44 is guided on the aforesaid vertical guide rods 17 and is operated from the main crank shaft of the machine by the pitman or connecting rods 45.

For adjusting the presser feet or shoes 41 in relation to the upper cross-head 44, the plunger rods 42 may have screw-threaded upper portions 46 engaged by rotatable but non-vertically movable sleeve nuts 47 journalled in said cross-head; said sleeve nuts being provided with means represented for example by worm-wheels 48, adapted to be operated by worm-shafts (not shown), whereby the sleeve nuts may be rotated simultaneously or independently as desired, according to whether it is desired to adjust the plunger rods and presser feet equally or unequally vertically.

From the foregoing description, it will be seen that the embosser head is carried indirectly by the cutter-head, being yieldingly supported by the stripper plate which is yieldingly held a limited distance below the cutter-head; and that the embosser-head is free of positive connection with the embosser actuating cross-head 44 and movable relative thereto. Among other advantages, this construction enables the embossers to be operated at a desired timed relationship in advance of the operation of the cutters, while nevertheless the embossers may move independently of the embosser actuating means and in unison with the cutters during a portion or portions of the cycle of operation.

It is desirable that the cutters and embossers should be so operated that the following actions occur. First, the embossing of the dough in advance of the cutting operation; the embossers being caused to engage and make an impression on the dough sheet while the cutters are descending. Second, the clearing of the embossers by the cutters to prevent adherence of dough to the embossers as they withdraw from the dough sheet. Third, the cutting or dieing-out of the biscuits by the cutters. Fourth, the clearing of the cutters from the dough by the embossers to prevent adherence of the cut biscuits or dough sheet to the cutters as they rise from the dough sheet.

In a machine of the continuous feed type, where the cutting and embossing mechanism is horizontally oscillated so as to move forwardly with the continuously moving dough sheet during the cutting and embossing operation, the actions referred to should occur within the interval during which substantial unison in the horizontal movements of the cutters and the dough sheet may be maintained.

With the illustrative mechanism, the movements of the cutters and embossers may be controlled to perform their successive functions at advantageous points in the cycle of operation of the machine; and the cutters and embossers may have a longer vertical stroke in proportion to the depth of the cutter-cups than would otherwise be feasible. Consequently the cutters and embossers may operate at a proportionately greater vertical speed, so that the time of the embossing and cutting operations is relatively reduced; the period of engagement of the embossers and cutters with the dough in the case of a long stroke cycle of the cutters and embossers being briefer than the period of engagement with the dough in the case of a shorter stroke cycle.

The illustrative mechanism may be incorporated, for example, in a machine of the type disclosed in patent to Green 1,292,311, dated January 21, 1919. In this specific machine, the cutting and embossing mechanism is horizontally oscillated by mechanism designed to effect horizontal motion of the cutters and embossers substantially in unison with the continuously moving dough sheet during a cutting period. The entire cutting and embossing mechanism is carried by a swinging frame which rocks on a bearing concentric with the main shaft of the machine, which is located a substantial distance below the cutters and embossers and carries the cranks or eccentrics for operating the cutter and embosser cross-heads, corresponding to the cross-heads 16 and 44 of the illustrative mechanism. This frame carrying the cutting and embossing mechanism is rocked through appropriate connections with a crank which while rotating is bodily rocked about the main shaft as an axis; the rotating and rocking movements of said crank giving a resultant motion which, during an interval in the cycle of the machine, has a substantially constant speed substantially equal to the speed of the dough apron. Said rocking and rotating crank from which the cutting and embossing mechanism is oscillated is rocked through appropriate connections with a crank on the main shaft, which for convenience will be hereinafter referred to as the main shaft crank. The mechanism referred to is fully described in said Green patent, and diagrammatically illustrated in Fig. 5 of that patent.

Assuming the illustrative mechanism to be incorporated in said Green patent machine, replacing the mechanism shown in Fig. 8 of said Green patent, it will be understood that the entire structure shown in Fig. 1 of the annexed drawings, excepting the continuously moving dough apron 4, but including the bed plate 5 and the vertically reciprocating cutter and embosser operating cross-heads 16 and 44, is horizontally oscillated on the axis of a subjacent main shaft carrying the cutter and embosser operating crank or eccentrics which work the pitman or connecting rods 18 and 45.

In the diagram shown in Fig. 5 of the annexed drawings, the numeral 50 denotes the axis of the main shaft; 51 and 52 designate the wrist pins of the cutter and embosser cranks; and 53 denotes the aforesaid main shaft crank which communicates rocking motion to the rocking crank (not shown) from which the frame carrying the cutting and embossing mechanism is oscillated, as explained in said Green patent. As represented in said diagram, for illustration, the cutter crank 51 is set 13° behind the main shaft crank 53, while the embosser crank 52 is set 38° 30′ in advance of the cutter crank.

With appropriate horizontal oscillation of the cutting and embossing mechanism to move forward in unison with the dough sheet during an interval of the forward movement, as explained in said Green patent, and with an appropriate angular relation and throws of the cutter and embossing cranks as represented for example in the diagram, Fig. 5, the cutting edges of the cutters and working faces of the embossers may travel in the orbits diagrammatically represented in Fig. 4, where 60 indicates the orbit of the cutters and 61 the orbit of the embossers.

An operation of the illustrative mechanism, considered for example as incorporated in said Green patent machine, with the stated crank arrangements and timing, may be explained as follows:

The normal relation of the cutters and embossers under the action of the springs 22 and 36, when free of the influence of the stripper plate arresting means or of action of the presser shoes 41 on the embosser head 30, is indicated in Fig. 1. On the down stroke of the cutters, before the arresting of the stripper plate 20, the embossers are being forced downward in advance of the cutters by the action of the embosser crank, through the positive bearing action of the presser shoes 41 on the embosser head. When the stripper plate 20 is arrested, the embosser crank being then near the end of its down stroke, the embossers are then forced into and impress the dough sheet, as is indicated in Fig. 6. Meanwhile the cutters are descending under the action of the cutter crank, the cutter-head 10 being moved downward toward the stripper plate and compressing the springs 22. The cutters reach the dough sheet after the embosser crank has passed its lowest dead center and the embossers have commenced to rise, so that the cutters will clear the embossers during the ascending movement of the embossers, and thereby serve to free the embossers from the dough sheet in event of any tendency of the dough to adhere to the embossers. The cutters continue to descend through the dough sheet and cut or die-out the embossed portions of the sheet from the main body thereof. Fig. 7 indicates the relation of parts just after the entry of the cutters into the dough sheet, the cutters having just previously cleared the rising embossers. During the cutting action ensuing after the position indicated in Figs. 7 and 10, and during the return movement or ascent of the cutters from the bottom to the top of the dough sheet, the embosser crank is on its up stroke, thereby raising the presser shoes 41. As the presser shoes are raised, the embosser-head 30 may rise under the action of the springs 36, but only as far as the bolt heads 38 of the bolts connecting the embosser-head and stripper plate. Thus during said cutting action, and as long as the stripper plate 20 is held down on its stops 25, the embosser can rise only slightly from the dough sheet. Hence the cutters in ascending quickly overtake the embossers which thus serve to clear the cutters and free them of the cut biscuits and the dough sheet in event of any tendency of the dough to adhere to the cutters. Thereafter the parts may assume the relationship shown in Fig. 8, in which relationship the cutters and embossers may move upwardly in unison during a certain portion of the cycle of the machine.

In biscuit cutting and embossing operations, ordinarily the dough sheet will tend to adhere to the dough apron rather than to the embossers and cutters, but more or less frequently there would be occasional tendency of the dough to stick to the embossers or cutters during their upward movements; in which cases the clearing of the embossers by the cutters prior to the cutting or dieing-out operation, and the clearing of the cutters by the embossers after the cutting operation and as the cutters rise from the dough sheet, may be of advantage. Moreover, in event of any such sticking of the dough sheet to the embossers or cutters as might tend to lift the dough sheet with the receding cutters and embossers, the stripper plate 20 would serve as a clearer plate, precluding the dough from following the cutters as the cutters withdraw through the opening in the stripper plate.

The period from the moment of entry of the embosser into the dough sheet until the clearing of the cutters after the cutting operation, i. e. the complete embossing and cutting operation and the subsequent clearing of the cutters as they rise from the dough sheet, may be within or slightly less than three tenths of one complete revolution of the main crank shaft; so that the period of uniform horizontal movement of the cutting and embossing mechanism and the dough apron may be correspondingly short.

In the illustrative machine, the period of uniform horizontal motion of the embossing cutter mechanism and the dough sheet may be considered as occurring, for example, during the phase of the cutter crank revolution embraced between the dial divisions 10 to 22 inclusive of the diagram shown in Fig. 5, this period being twelve fortieths or three tenths of the revolution of the crank shaft. In the diagram shown in Fig. 4, the point in the forward travel of the cutters and embossers where said motion in unison with the dough sheet begins is indicated by the vertical line 70; and the point where said motion in unison ends is indicated by the vertical line 71. The point in the orbit of the embossers where the embossers enter the dough is indicated at 80. The point where the cutters clear the embossers is indicated at 81; the point where the cutters enter the dough at 82; and the point where the embossers clear the cutters, as the cutters rise from the dough sheet, is indicated at 83.

Referring to Fig. 4, it will be observed that the embossers, having impressed the dough, rise to the top of the dough sheet as the cutters descend into the dough, the points 81 and 82 where the cutters clear the embossers and enter the dough being nearly coincident, and occurring shortly before the end of the down stroke of the cutter; and that the embossers remain only slightly raised during the ensuing cutting action, or while the cutters move down and up through the dough, and until the cutters in rising are cleared by the embossers at the point 83 in the cutter orbit, which occurs shortly after the completion of the down stroke of the cutters. At the moment of entry of the cutters into the dough sheet, indicated by the point 82 in the cutter orbit, the cutter crank may be at or just approaching the position indicated by the dial division 18 in Fig. 5; while at the moment of clearance of the cutters by the embossers, represented by the point 83 in the cutter orbit, the cutter crank may be at or just beyond the position represented by the dial division 21 in Fig. 5. Thus a comparatively brief time interval is consumed between the clearing of the embossers by the descending cutters at 81, and the clearing of the rising cutters by the embossers at the point 83; and this as well as the proportionally longer vertical stroke of the cutters and embossers permitted by the illustrative mechanism enables the complete period of engagement of the dough by the embossers and cutters to fall within the limited period of forward movement of the cutting mechanism in substantial unison with the dough sheet, thus minimizing tendency to impair the perfection of embossing and cutting action by drag of the cutting and embossing dies relative to the dough sheet.

The embosser crank has a comparatively long stroke, in this instance approximating the length of the cutter crank stroke, so that the embosser is operated with a hammer-like blow to make a quick impression on the dough and recede, being then detained in its upward movement during the ensuing quick stroke of the cutter and until the cutter in its upward movement is cleared by the embosser, as previously explained. Among other advantages, a quick impressive action of the embosser minimizes tendency of the embosser as it bears on the dough to cause puffing or rising of the contiguous portions of the dough sheet as in the case of a slow moving embosser.

Obviously the present invention is not limited to the precise construction shown in the drawings, since the details of construction, arrangement and mode of operation may be variously modified to suit different conditions or requirements according to the biscuits or other units to be embossed and cut. Moreover it is not indispensable that all the features of the invention be used conjointly since they may be advantageously used in various different combinations and sub-combinations.

Having thus described my invention, I claim:

1. An embossing cutter mechanism comprising, in combination, a coacting cutter and embosser adapted to clear one another; operating means therefor relatively timed so that the embosser operates upon the material before the cutter and begins its up stroke when the cutter reaches the material and is overtaken in its up stroke by the cutter; and means retarding the movement of the embosser relative to said operating means during said up stroke.

2. An embossing cutter mechanism comprising, in combination, a coacting cutter and embosser adapted to clear one another; a stripper plate adapted to maintain a fixed relation to the material during the cutting and embossing operation; means yieldingly resisting movement of the cutter and embosser relative to the stripper plate and limiting movement of one of said elements upward from the stripper plate; and operating means for the cutter and embosser timed one in advance of the other, said operating means being unconnected positively with the element having a limited upward movement relative to said operating means.

3. An embossing cutter mechanism comprising, in combination, a stripper plate; an embosser head; a cutter head; means yieldingly separating the cutter head and stripper plate; means yieldingly holding the embosser head a limited distance above the stripper plate; an operating crank connected with the cutter head; and an operating crank timed in advance of the cutter operating crank having means for forcing down the embosser head but not positively connected therewith.

4. An embossing cutter mechanism comprising, in combination, the stripper plate 20; the cutter head 10; the embosser head 30; spring and stud connections of the character described between the cutter and embosser heads and the stripper plates; and actuators for forcing down the cutter and embosser heads.

5. An embossing cutter mechanism comprising, in combination, the stripper plate 20; the cutter head 10; the embosser head 30; spring and stud connections of the character described between the cutter and embosser heads and the stripper plates; an actuator connected with the cutter head; and an actuator for the embosser head not positively connected therewith.

6. A machine of the class described comprising, in combination, means for continuously feeding the sheet of material to be cut or subdivided; a horizontally oscillating cutter and associated embosser moving substantially in unison with said sheet during a portion of the forward travel of the cutter and embosser; long stroke actuating means for operating the embosser with a quick hammer-like blow; cutter operating means timed to cause the cutter to enter the dough as the embosser rises; and means detaining movement of the embosser as the cutter moves down and up through the sheet, whereby the embosser clears the cutter shortly after the completion of the down stroke of the cutter; the cutter and embosser actuating means being timed in relation to the horizontal oscillations of the cutter and embosser to effect their successive actions within the period of their horizontal travel in unison with the sheet.

7. A machine of the class described comprising, in combination, means for continuously feeding the sheet of material to be cut or subdivided; a horizontally oscillating cutter and associated embosser moving substantially in unison with said sheet during a portion of the forward travel of the cutter and embosser; and means for operating said cutter and embosser within the period of their horizontal travel in unison with the sheet, to cause the embosser to impress the sheet in advance of the cutting action and then to remain slightly raised during the movement of the cutter down and up through the sheet and to effect clearance of the cutter by the embosser closely after the completion of the down stroke of the cutter.

8. In a machine of the character described the combination with a continuously moving carrier, of an oscillating cutter and embossing mechanism arranged to move substantially in synchronism with said carrier at periods during each cycle of oscillation, a cutter and an embosser for operating on the same unit of material on said carrier in the same cycle of operation, cutter operating mechanism, said cutter operating mechanism being constructed and arranged to move both said cutter and embosser during a portion of the cycle of operation, and other mechanism for controlling the movement of said embosser during another portion of the cycle of operation.

9. A machine of the character described comprising in combination a support for the material to be operated upon, a telescoped cutter and embosser, a clearer plate having an opening through which said cutter and embosser operate, said clearer plate being resiliently carried by said cutter, said embosser being resiliently carried by said clearer plate so that the embosser normally projects beyond said cutter, means connected with said cutter for reciprocating said cutter, a stop associated with said support for arresting the travel of said plate a limited distance from said support, and means for controlling said embosser for a limited period of the cycle of operations during which said embosser operates on said material, said cutter reciprocating means and said embosser controlling means being relatively constructed and arranged to cause the embosser to operate first after movement of the clearer plate has been arrested, whereby the operation of the cutter clears the embosser and the movement of the cutter to its normal position causes the embosser to clear the cutter.

10. In a machine of the character described, a cutter and embossing mechanism comprising in combination a cutter and an embosser constructed and arranged to operate on the same unit of material at successive periods in the same cycle of operations, a clearer plate associated with said cutter for assisting in clearing the material from said cutter, cutter operating mechanism, and means for operatively connecting said embosser with said clearer plate so that during a portion of the cycle of operation the movement of said embosser is controlled by said clearer plate.

11. In a machine of the character described, a cutter and embossing mechanism comprising in combination a cutter and an embosser constructed and arranged to operate on the same unit of material at successive periods in the same cycle of operations, cutter operating mechanism, means operatively connecting said embosser with said cutter mechanism whereby said embosser is under the control of said cutter mechanism for a portion of the cycle of operations, and other mechanism for operating the embosser for the balance of the cycle.

12. In a machine of the character described, a cutter and embossing mechanism comprising in combination a cutter and an embosser constructed and arranged to operate on the same unit of material at successive periods in the same cycle of operations, cutter operating mechanism, embosser operating mechanism and means for operatively disconnecting said embosser and its operating mechanism intermediate its movement away from the material.

13. In a machine of the character described, a cutter and embossing mechanism comprising in combination a cutter and an embosser constructed and arranged to operate on the same unit of material at successive periods in the same cycle of operations, cutter operating mechanism, embosser operating mechanism, means for operatively disconnecting said embosser and its operating mechanism for a portion of the cycle of operations, and means for operatively connecting said embosser with said cutter operating mechanism during another portion of said cycle of operations.

14. In a machine of the character described, a cutter and embossing mechanism comprising in combination a cutter and an embosser constructed and arranged to operate on the same unit of material at successive periods in the same cycle of operations, cutter operating mechanism constructed and arranged to actuate both said cutter and embosser, and other operating means for altering the relation of said embosser to said cutter operating mechanism during a portion of the cycle of operations.

15. In a machine of the character described, a cutter and embossing mechanism comprising in combination a cutter and an embosser constructed and arranged to operate on the same unit of material, actuating means operatively connected to said cutter and embosser, and other operating means for causing said cutter and embosser to move relatively to each other during a portion of the cycle of operations to cause them to clear one another in proximity to the material.

16. In a machine of the character described, a cutter and embossing mechanism comprising in combination a cutter and an embosser constructed and arranged to operate on the same unit of material at successive periods in the same cycle of operations, operating mechanism for said cutter and embosser, and means for resiliently connecting said cutter and embosser whereby they are capable of relative movement, and operating means independent of said operating mechanism for causing said cutter and embosser to move relatively during a portion of the cycle of operations.

17. In a machine of the character described the combination comprising means for continuously moving a sheet of material to be acted upon, a cutter and an embosser constructed and arranged to operate on the same area of material during the same cycle of operation, means for moving said cutter and embosser substantially in unison with said material at the time of such operations thereon, cutter and embosser operating mechanism, and means for causing said cutter and embosser relatively to clear one another in proximity to the material.

18. In a machine of the character described the combination comprising means for continuously moving a sheet of material to be acted upon, a cutter and an embosser constructed and arranged to operate on the same area of material during the same cycle of operation, means for moving said cutter and embosser substantially in unison with said material at the time of such operations thereon, cutter and embosser operating mechanism, and means independent of said operating means for causing said embosser to rise from the material with a substantially more rapid movement than the movement of said cutter operating mechanism.

19. In a machine of the character described, cutter and embossing mechanism comprising in combination, a cutter, a clearer plate yieldingly connected to said cutter, an embosser carried by said clearer plate and means for permitting said embosser to yield operatively on said clearer plate, and operating mechanism for operating said cutter and embosser.

20. A mechanism of the class described comprising, in combination, a cutter and embosser for operating on the same unit of material in the same cycle of operation; and means for operating said cutter and embosser in different phases of the cycle and including means for operatively disconnecting one of them from its operating means intermediate its movement away from said material.

21. In a machine of the character described, an embossing cutter mechanism comprising, in combination coacting cutter and embosser elements constructed and arranged to clear one another during their operation; means for delivering a quick impulse to one of said elements to cause the latter to act quickly upon the material and to pause in its receding movement; and means for operating the other element to engage the material as the first mentioned element rises and to act on said material and recede therefrom while the first mentioned element is in close proximity thereto.

22. In a machine of the character described, the combination comprising a continuously traveling carrier for carrying a sheet of material to be acted upon, a co-acting cutter and embosser constructed and arranged to act on the same unit of material in the same cycle of operation, means for oscillating said cutter and embosser so that during each cycle of oscillation said cutter and embosser move substantially in synchronism with said material, means for reciprocating said cutter and embosser to act successively on said material during the period of substantially synchronous travel, said reciprocating means being constructed to cause said cutter and embosser to clear one another in close proximity to said material and intermediate the limits of their respective reciprocations.

23. In a machine of the character described, the combination comprising a continuously traveling carrier for carrying a sheet of material to be acted upon, a co-acting cutter and embosser constructed and arranged to act on the same unit of material in the same cycle of operation, means for oscillating said cutter and embosser so that during each cycle of oscillation said cutter and embosser move substantially in synchronism with said material, means for reciprocating said cutter and embosser to act successively on said material during the period of substantially synchronous travel, said reciprocating means being constructed to cause said cutter to clear said embosser and the embosser subsequently to clear said cutter in proximity to said material and intermediate the limits of the then respective reciprocations.

24. In a machine of the character described the combination comprising means for continuously moving a sheet of material to be acted upon, a cutter and an embosser constructed and arranged to operate on the same unit of material during the same cycle of operation, means for moving the cutter and embosser forward and backward during each cycle of operation, said means being constructed and arranged to move said cutter and embosser approximately in unison with said material during a part of their forward movement, means for operating said cutter and embosser to operate upon the material successively and to leave the material and to clear one another a substantial interval before the termination of the forward travel of said cutter and embosser, whereby said operations upon said material may take place during that portion of said forward travel which most closely approximates unison with said material.

25. In a machine of the character described the combination comprising means for continuously moving a sheet of material to be acted upon, a cutter and an embosser constructed and arranged to operate on the same area of material during the same cycle of operation, means for moving said cutter and embosser substantially in unison with said material at the time of such operations thereon, cutter and embosser operating mechanism for operating said cutter and embosser to act successively on said material, and means for retarding the travel of said embosser after it leaves the material and in close proximity thereto until the cutter overtakes it, whereby said embosser clears said cutter in close proximity to said material.

26. In a machine of the character described an embossing cutter mechanism comprising, in combination, a coacting cutter and embosser for operating upon the material and adapted to clear one another; means for operating said cutter and embosser in succession to act on the material; and means movably connecting said cutter and embosser so that in normal relation the embosser protrudes beyond the cutter, said means being constructed and arranged to permit said operating means to move said cutter and embosser relatively to operate upon the material; said operating means being constructed and arranged to permit the restoration of said normal relation of the cutter and embosser following their operation on the material, whereby to cause the embosser automatically to clear the cutter.

27. In a machine of the character described, cutter and embossing mechanism comprising, in combination, a reciprocating cutter and a reciprocating embosser constructed and arranged to operate on the same unit of material at successive periods in the same cycle of operation, cutter operating mechanism for causing said cutter to operate periodically on the material, embosser operating mechanism having a substantially greater amplitude of reciprocation than said embosser, and means for operatively disconnecting said embosser from said embossing mechanism so as to permit the latter to move through a portion of its reciprocative cycle without carrying said embosser, whereby said embosser operating mechanism may be actuated to give said embosser a quick embossing movement.

28. In mechanism of the class described, the combination comprising a cutter and an embosser for operating on the same unit of material in the same cycle of operation, cutter and embosser operating mechanism constructed and arranged to actuate said cutter and embosser to operate on the material in different periods of the same cycle of operation, means for movably connecting said cutter and embosser permitting relative movement thereof, said means constructed and arranged to limit said relative movement in one direction, said operating mechanism being constructed and arranged to permit said connecting means to limit the relative movement of said cutter and embosser.

29. In a machine of the character described, the combination of a cross-head, embossers carried thereby for embossing material, means for reciprocating the cross-head intermittently to cause the embossers to impress the material, and means to retract the embossers from the material independently of retreat of the cross-head away from the material.

In testimony whereof, I have signed my name to this specification.

THOMAS L. GREEN.